(12) United States Patent
Cros et al.

(10) Patent No.: US 8,474,749 B2
(45) Date of Patent: Jul. 2, 2013

(54) AIRCRAFT INCLUDING AN UNDERCARRIAGE MOTOR

(75) Inventors: Christophe Cros, L'Union (FR); Pierre Henri Brousse, Ramonville Saint Agne (FR); Jeremy Bedarrides, Toulouse (FR)

(73) Assignees: Airbus (S.A.S.), Blagnac (FR); Airbus Operations SAS, Toulouse (FR); Airbus Operations Ltd., Bristol (GB)

( * ) Notice: Subject to any disclaimer, the term of this patent is extended or adjusted under 35 U.S.C. 154(b) by 225 days.

(21) Appl. No.: 13/113,627

(22) Filed: May 23, 2011

(65) Prior Publication Data

US 2011/0290933 A1 Dec. 1, 2011

(30) Foreign Application Priority Data

May 26, 2010 (FR) ...................... 10 02222

(51) Int. Cl.
*B64C 25/50* (2006.01)
(52) U.S. Cl.
USPC ....... 244/50; 244/100 R; 244/111; 244/103 R
(58) Field of Classification Search
USPC .......................................................... 244/50
See application file for complete search history.

(56) References Cited

U.S. PATENT DOCUMENTS

| | | | | |
|---|---|---|---|---|
| 3,762,670 | A * | 10/1973 | Chillson | 244/50 |
| 6,450,448 | B1 * | 9/2002 | Suzuki | 244/104 FP |
| 7,445,178 | B2 * | 11/2008 | McCoskey et al. | 244/50 |
| 2006/0061213 | A1 * | 3/2006 | Michalko | 307/9.1 |
| 2006/0065779 | A1 * | 3/2006 | McCoskey et al. | 244/100 R |
| 2007/0284480 | A1 * | 12/2007 | Atkey et al. | 244/135 R |
| 2009/0114765 | A1 * | 5/2009 | Cox et al. | 244/50 |
| 2009/0218440 | A1 * | 9/2009 | Dilmaghani et al. | 244/50 |
| 2009/0321163 | A1 * | 12/2009 | Suzui | 180/65.265 |
| 2010/0006699 | A1 * | 1/2010 | Sullivan | 244/111 |
| 2010/0276535 | A1 * | 11/2010 | Charuel et al. | 244/50 |
| 2011/0155846 | A1 * | 6/2011 | Bulin et al. | 244/50 |
| 2011/0297786 | A1 * | 12/2011 | Sweet et al. | 244/103 R |
| 2012/0001018 | A1 * | 1/2012 | Gilleran et al. | 244/50 |

FOREIGN PATENT DOCUMENTS

| | | |
|---|---|---|
| FR | 2 930 759 A1 | 11/2009 |
| FR | 2 930 760 A1 | 11/2009 |
| WO | WO 95/29094 A1 | 11/1995 |
| WO | WO 2009/151622 A1 | 12/2009 |

OTHER PUBLICATIONS

Preliminary Search Report for priority French Patent Application No. 10 02222, dated Dec. 8, 2010 (w/ English translation).

* cited by examiner

*Primary Examiner* — Christopher P Ellis
*Assistant Examiner* — Medhat Badawi
(74) *Attorney, Agent, or Firm* — Oliff & Berridge, PLC

(57) ABSTRACT

The aircraft includes at least one engine suitable for propelling the aircraft in flight, at least one motor of an undercarriage, and automatic means arranged to cause the aircraft to taxi under drive directly from the engine, while simultaneously using the motor for taxiing, other than during takeoff or landing.

10 Claims, 2 Drawing Sheets

AIRCRAFT INCLUDING AN UNDERCARRIAGE MOTOR

FIELD OF THE INVENTION

The invention relates to aircraft, and in particular to their movements on the ground, specifically to taxiing between a takeoff and landing runway and a parking point in the vicinity of a terminal.

In conventional manner, while moving on the ground, aircraft either make use of their engines, or they are towed by vehicles, which transmit thrust to them via an undercarriage. This applies in particular to commercial aircraft using turbojets or turboprops as their engines. However using engines for taxiing gives rise to significant levels of fuel consumption and associated pollution. Having recourse to a specialized tractor vehicle limits the independence of the aircraft when moving on the ground.

BACKGROUND OF THE INVENTION

Proposals are made, in particular in documents FR-2 930 759 and FR-2 930 760, to place motors in association with certain undercarriages so as to enable aircraft to taxi under their own power. Such a motor may be constituted, for example by a microturbine installed in an undercarriage. Nevertheless, such devices are complex and require fuel or compressed air to be delivered to the undercarriage, thereby adding pipework and thus likely to give rise to additional weight and manufacturing costs for the aircraft.

Proposals have also been made to provide an undercarriage with an electric motor powered by the aircraft's auxiliary power unit (APU).

However, the power needed to move an aircraft on the ground is generally of the same order of magnitude as the electrical power available from the APU for powering the other systems that use power on the ground. This means that the dimensions and the capacity of the APU need to be increased very significantly, as does its weight. An important part of the saving in fuel consumption is then lost as a result of the additional weight.

Furthermore, conveying that amount of electrical power to the undercarriage requires a dedicated power line to be installed, thereby contributing to making the design of the aircraft more complex and increasing its weight.

Another drawback of that solution relates to delivering hydraulic or electrical power to the systems needed for an aircraft that is taxiing and preparing for flight. Nowadays, the APU is not designed to be capable nominally, of powering all of the needs of the airplane. One method that has been envisaged for enabling it to power the motor consists in connecting it to the overall power supply network of the aircraft. The APU can thus deliver the power needed by each of the power-consuming devices while the airplane is taxiing. However that also leads to the aircraft being made significantly more complex and heavier.

It is also possible to envisage defining two independent stages of taxiing. A first stage makes use solely of the motors powered by the APU and forms a stage merely of transferring the aircraft from the terminal to the vicinity of the takeoff runway. This stage may be performed after minimum verification of the preparation of the aircraft and under comfort conditions for the passengers that are potentially degraded. The second stage, shortly before takeoff, is performed solely with the engines. It serves to prepare the aircraft and in particular to perform the usual verifications ("check lists") and to put the passengers into conditions of comfort and safety that are appropriate for flying, e.g. so as to be able to read the safety instructions. However that method raises operational difficulties that are difficult for an airline to accept. In particular, in the event of an anomaly being detected shortly before takeoff, the aircraft needs to return to the terminal in order to resolve the problem.

OBJECT AND SUMMARY OF THE INVENTION

An object of the invention is to improve aircraft taxiing.

To this end, the invention provides an aircraft that comprises:

at least one engine suitable for propelling the aircraft in flight;

at least one motor of an undercarriage; and automatic means arranged to cause the aircraft to taxi under drive directly from the engine while simultaneously using the motor for taxiing, other than during takeoff or landing.

This thus involves use that may be referred to as "hybrid" or "in combination" of a device for driving at least one undercarriage wheel together with one or more of the engines of the aircraft.

Advantageously, the automatic means are arranged to use the motor for braking while taxiing.

When the weight of the aircraft is far enough away from its maximum authorized weight, then the thrust from the engines, e.g. while idling, generally suffices to enable the aircraft to accelerate continuously. Under such circumstances, the pilot is conventionally obliged to use the brakes in order to control taxiing speed. That gives rise to premature wear of the brakes, a phenomenon that is particularly harmful for carbon brakes where wear stems mainly from the number of times the brakes are applied, as opposed to the amount of energy they dissipate. Because of that characteristic, the motors can be used as generators so as to perform a braking function holding back the aircraft to a certain speed as selected by the pilot. In this way, speed remains constant and the pilot does not need to apply several series of braking operations using the members that are dedicated for this function, thereby limiting the amount of wear they suffer. The energy absorbed by the motors may be dissipated, or better it may be used for powering the aircraft electricity network, the motor then also acting as an electricity generator.

Advantageously, the automatic means are arranged to control taxiing directly and simultaneously by means of the engine and the motor.

Thus, taxiing is hybrid, being performed both by means of the engine, e.g. operating by burning fuel such as kerosene, and by the motor that is preferably powered with electrical or hydraulic energy. In such a configuration, the power generated by the APU for the motor may be backed up or replaced by the power generated by the generator of the engine. The power thus made available to the APU enables it to power all of the functions also needed for taxiing and preparing for takeoff without any need to increase its capacity. It is thus possible to implement the invention without significantly increasing the complexity and the weight of the systems of the aircraft as would be necessary with an APU delivering all of the power that is fed to the motor. The only significant additional weight for the aircraft comes from the motors. Naturally, with one or more of the engines running, some of the fuel savings associated with taxiing using only a motor will be lost as a consequence. However this loss is very small, since the method can be implemented while limiting the fuel consumption of the engines during taxiing, thereby preserving a significant saving of engine fuel. Provision may be made for this hybrid taxiing to be implemented using the engine(s) operating at idling speed.

Advantageously, the automatic means are arranged to cause taxiing to be driven by means of at least two flight propulsion engines.

In this embodiment, the thrust delivered by the engines, e.g. while idling, is significant and serves to provide the major portion of the acceleration of the aircraft, even if the weight of the aircraft is heavy.

Preferably, the automatic means are arranged to cause the engines to deliver power for taxiing that is greater than the power delivered by the motor.

Thus, the motor does no more than provide additional power during stages of setting the aircraft into motion and of accelerating, with it then being possible for the engines of the aircraft to be left at idling speed throughout the taxiing operation.

Provision may be made for the automatic means to be arranged to cause the power delivered for taxiing by the engines to remain constant.

It is then possible to provide for the automatic means to be arranged so as to cause the engine power to be kept constant while increasing the power delivered for taxiing purposes by the motors.

The additional power is thus delivered by those motors only when needed.

Provision may also be made for the automatic means to be arranged to cause the power delivered for taxiing by the motors to remain constant.

Provision may then be made for the automatic means to be arranged to cause said power to be kept constant while causing the power delivered by the engines to be increased for taxiing purposes. Such an increase preferably takes place only under exceptional circumstances where the automatic means call on additional thrust from the engines.

In order to limit the impact of the invention in terms of aircraft weight, it is preferable to dimension the motors so that they operate under nominal conditions: little slope, medium wind, conventional taxiing conditions. The engines then run at idling speed, for example. When the aircraft is operating under conditions that are too remote from those nominal conditions, more power is taken from the engines, in other words they operate at a speed greater than idling speed. Such circumstances are nevertheless exceptional, so the overall benefit of the system remains better than when the motors are likewise dimensioned to be capable of handling such exceptional circumstances. For example, the slopes normally encountered on airport taxiways are relatively shallow, being of the order of 0.5% to 1%. Under very limiting circumstances and for short runs on an airport, slopes may be as great as 1.5% or even more. Only under those circumstances, is provision made to increase the thrust delivered by the engines in order to enable the aircraft to taxi. The torque delivered by the motors can consequently remain limited, as can their weight.

Advantageously, the aircraft includes at least two flight propulsion engines and the automatic means are arranged to control taxiing directly and simultaneously under drive from a single one of those engines and the motor.

This embodiment requires one or more motors that are more powerful than in the preceding embodiment, but it provides a greater saving in fuel consumption from the engines.

In one embodiment, the aircraft has only two propulsion engines.

Advantageously, the automatic means are arranged to cause power to be supplied to the motor preferably mainly, or even exclusively, from an electricity generator of the engine.

Advantageously, the aircraft includes a common manual control member suitable for controlling the engine and the motor simultaneously while taxiing.

This may be a control for accelerating the aircraft, or a control for braking the aircraft. It may equally well be a control that acts both on acceleration and on braking.

The invention provides a method of taxiing an aircraft, wherein away from a takeoff and/or landing runway, the aircraft is caused to taxi under drive directly from at least one aircraft engine suitable for propelling the aircraft in flight while simultaneously using at least one motor of an undercarriage of the aircraft for taxiing.

Preferably, the aircraft is caused to taxi solely under drive from means situated on board the aircraft. This avoids any need for an external tractor vehicle.

The invention also provides a computer program including code instructions suitable for controlling the execution of a method of the invention when executed on a computer.

The invention also provides a data recording medium including such a program in recorded form.

Finally, the invention provides making such a program available on a telecommunications network for downloading purposes.

BRIEF DESCRIPTION OF THE DRAWINGS

Other characteristics and advantages of the invention appear further from the following description of two embodiments given as non-limiting examples with reference to the accompanying drawings, in which.

MORE DETAILED DESCRIPTION

Figure 1:
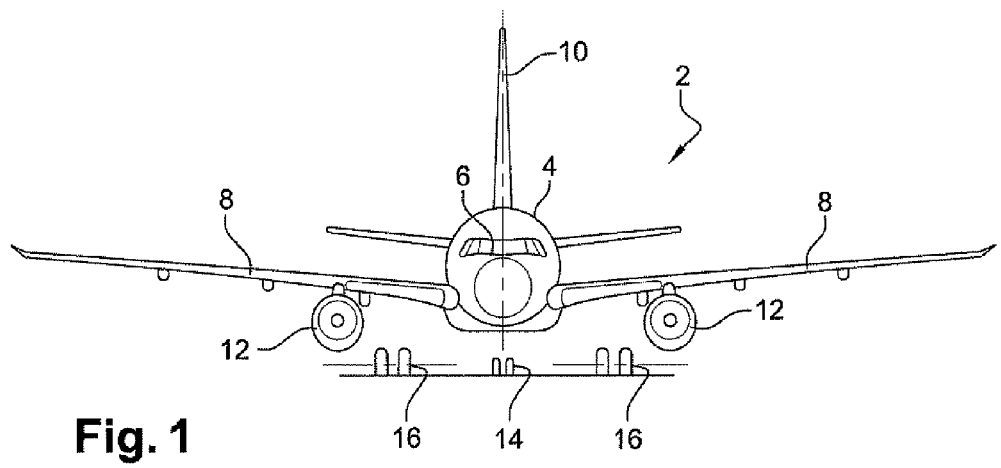
FIG. 1 is a face view of an aircraft in a first embodiment of the invention.
Figure 2:
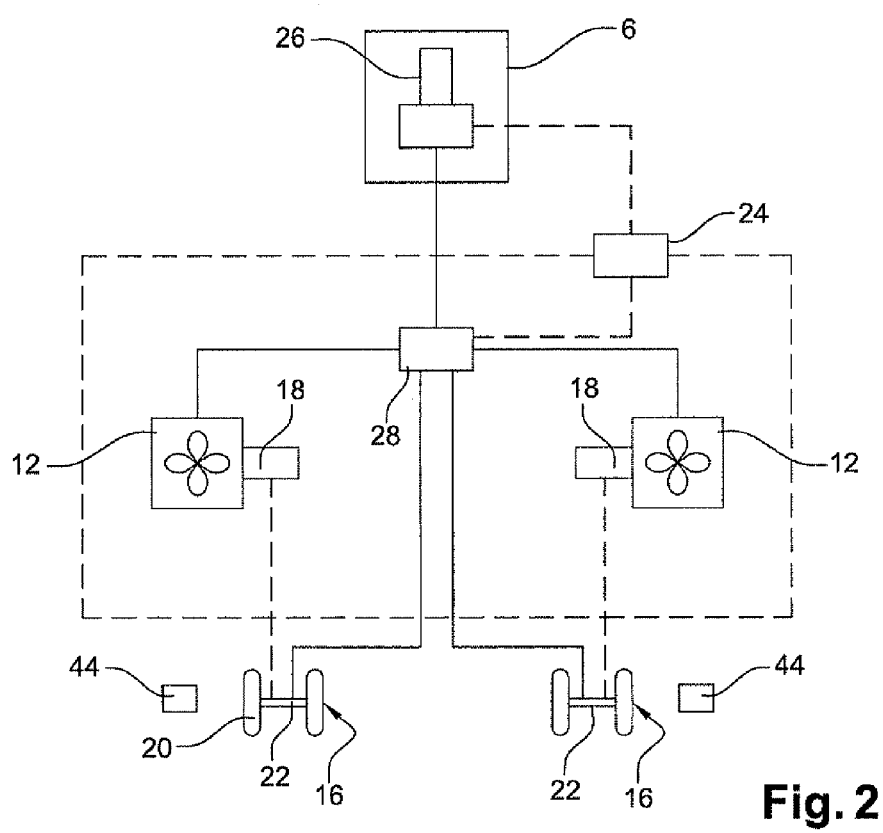
FIG. 2 is a diagrammatic view showing certain members of the FIG. 1 aircraft.

A first embodiment of an aircraft 2 of the invention is shown in FIGS. 1 and 2.

In this example the aircraft 2 is an aerodyne, and specifically an airplane. More specifically it is a commercial airliner for transporting freight and/or passengers. It is suitable for receiving at least one person. It has a fuselage 4 with a cockpit 6 of the airplane at the front thereof. It has two wings 8 extending on either side of the fuselage together with a tail fin 10. The airplane 2 has two engines 12 carried by respective ones of the wings 8 for propelling the airplane in flight. By way of example they may be turbojets or turboprops. The engines 12 operate by burning a fuel such as kerosene coming from tanks (not shown) of the airplane. Each engine 12 is associated with an electricity generator 18 having a rotary portion that is suitable for being driven by the engine in order to produce electricity.

The airplane has undercarriages comprising a nosewheel 14 situated under the fuselage and main undercarriages 16, there being two main undercarriages in this example, which undercarriages are connected to respective ones of the wings 8. Each main undercarriage 16 has wheels 20, e.g. two or four wheels, together with a motor 52, specifically an electric motor. The motor is suitable for rotating the wheels of the undercarriage in order to enable the airplane to taxi on the ground or in order to contribute to taxiing.

The airplane 2 preferably has an APU 24, suitable for supplying electricity via an on-board electricity network to various members of the airplane such as on-board computers and members serving to ensure passenger comfort. It is thus capable of powering lighting units, units for displaying and producing sound and images, etc. Specifically, the APU is electrically connected to the motors 22 of the main undercarriages in order to power them electrically or in order to receive electricity from them when they act as generators. The generators 18 of the engines 12 are also electrically connected to the motors 22 of the undercarriages.

The cockpit 6 is occupied by at least one pilot and it includes control members of the airplane. These include a member 26 that is connected to an on-board computer 28, itself connected to the engines 12 and to the main undercarriages 16. By means of these connections, the member 26 is suitable for exchanging signals, data, and commands with the computer 28, which in turn can do the same with the engines 12 and with the motors 22 of the undercarriages.

In FIG. 2, for clarity in the drawing, the connections serving to convey electrical power are drawn in dashed lines while the connections for conveying commands, data, and signals are drawn in continuous lines.

All of those various members are adapted, designed, and dimensioned so as to enable the method that is described below to be implemented. The method seeks to enable the airplane to taxi on the ground, in particular in an airport zone 30 of the kind shown in FIG. 3. It comprises an air terminal 32 having airplanes parked close thereto and serving to receive goods and/or passengers for embarking or disembarking onto or from the airplanes. The zone 30 includes a runway 34 for takeoff and landing, a main parking area 36, and paths or taxiways 38 connecting the area to the runway 34.

The method described below relates to the airplane taxiing on the area 36 and on the taxiways, other than on the runway 34. This taxiing serves specifically to move the airplane along a path 40 from a parking point to the runway 34, or along a path 42 from the runway to a parking point. The path 40 involves taxiing prior to takeoff and the path 42 involves taxiing after landing.

Below, the aircraft is driven in taxiing directly by means of at least one of the engines 12 while simultaneously using at least one of the motors 22 of the landing gear and preferably both motors 22 for taxiing purposes.

It is then possible to use the motor for braking purposes while taxiing, but usually the airplane is driven in taxiing directly and simultaneously by means of at least one of its propulsion engines 12 and by means of the motors 22, thus producing all of the driving force needed for taxiing.

First Implementation

In a first implementation of the invention, the airplane is caused to taxi by means of the two engines 12 of the airplane. The thrust they generate when idling is already considerable and suffices on its own to give the airplane most of the acceleration it needs for taxiing, even when the airplane is very heavy. The motors 22 provide additional power when starting to taxi and in order to accelerate taxiing. The engines 12 may idle throughout the operation. In order to avoid increasing the weight of the aircraft, the motors 22 are dimensioned to operate under nominal conditions, i.e. little slope, medium wind, and conventional taxiing conditions. When the aircraft is operating under conditions that are remote from nominal conditions, the engines 12 are run at a speed greater than idling speed.

When the weight of the aircraft is sufficiently far below its maximum weight, the taxiing thrust from the engines 12 while idling suffices to enable the airplane to accelerate continuously. In order to control taxiing speed, the pilot needs to brake the aircraft. For this purpose, instead of using the dedicated brake member 44 acting on the landing gear wheels, the pilot may use the motors 22 by causing them to operate as generators. The energy absorbed in this way by the motors is transmitted to the on-board electricity network.

In this embodiment, both engines 12 remain in operation, thereby driving the on-board electrical and hydraulic generators. On certain models of aircraft, for example the model known as "A320", the total power provided by such generators suffices amply for powering all of the systems needed for taxiing and preparing for flight, and for powering the motors 22.

In the event of one or more of the motors 22 failing, or in the event of a failure of one or more of the devices that serve to power them or to control them, it is possible to make the corresponding motor(s) inactive. Since the engines 12 are running, the pilot can continue taxiing normally under drive generated in conventional manner solely by the engines 12. Operational risks for the mission of the airplane are thus very low. In comparison, if taxiing is taking place solely under drive from the motors 22, it would be necessary, under such circumstances, to relight the engines 12 in order to continue with the mission, and under the best possible circumstances that would lead to a loss of time of at least several minutes. In the event that the taxiing was also taking place by means of the motors 22 on their own under power from the APU, there would no longer be redundancy in terms of power generation. Consequently, a single failure of the APU would cause the airplane to be immobilized and lose its lights and some of its communications means. That would lead to operational difficulties since a vehicle would need to go out in order to fetch it and tow it back to the terminal. Furthermore, that runs the risk of the airplane taxiing under conditions of poor visibility. Conversely, in the present situation, where the engines 12 are running during taxiing, electricity generation is performed with redundancy by the engines and by the APU. In the event of a single failure, the airplane consequently conserves at least one working generator. If necessary, the pilot can then bring the airplane under its own power back to the terminal in order to repair the breakdown or even to start the APU and continue its mission, if procedures allow that.

The power that needs to be delivered to the motors 22 is low, for example it may be of the order of 10 kilowatts (kW). This level of power can easily be taken from the aircraft electricity network without special modification and without overdimensioning the generators or the network. It suffices to install a power supply line from the airplane electrical core to the module for controlling the motors (constituted in particular by electronic power modules) and then from those modules to the motors 22. When utilized in this way, the generators and the electricity network are not overloaded compared with nominal utilization. The impact of implementing the invention on the lifetime and the maintenance cost of the generators and the network is thus very little or even non-existent.

In a variant, the invention may be implemented using motors 22 that are not electrical, but hydraulic. The power delivered to the motors may then be taken from the airplane hydraulic network.

During a conventional taxiing operation using the engines 12 alone, the consumption of kerosene is much greater than that of the same engines while idling. This extra consumption is due to stages of acceleration during which the pilot needs to increase thrust. The utilization of the hybrid system of the invention makes it possible to use the engines while idling throughout the taxiing stage, thereby limiting fuel consumption.

Second Implementation

Figure 3:
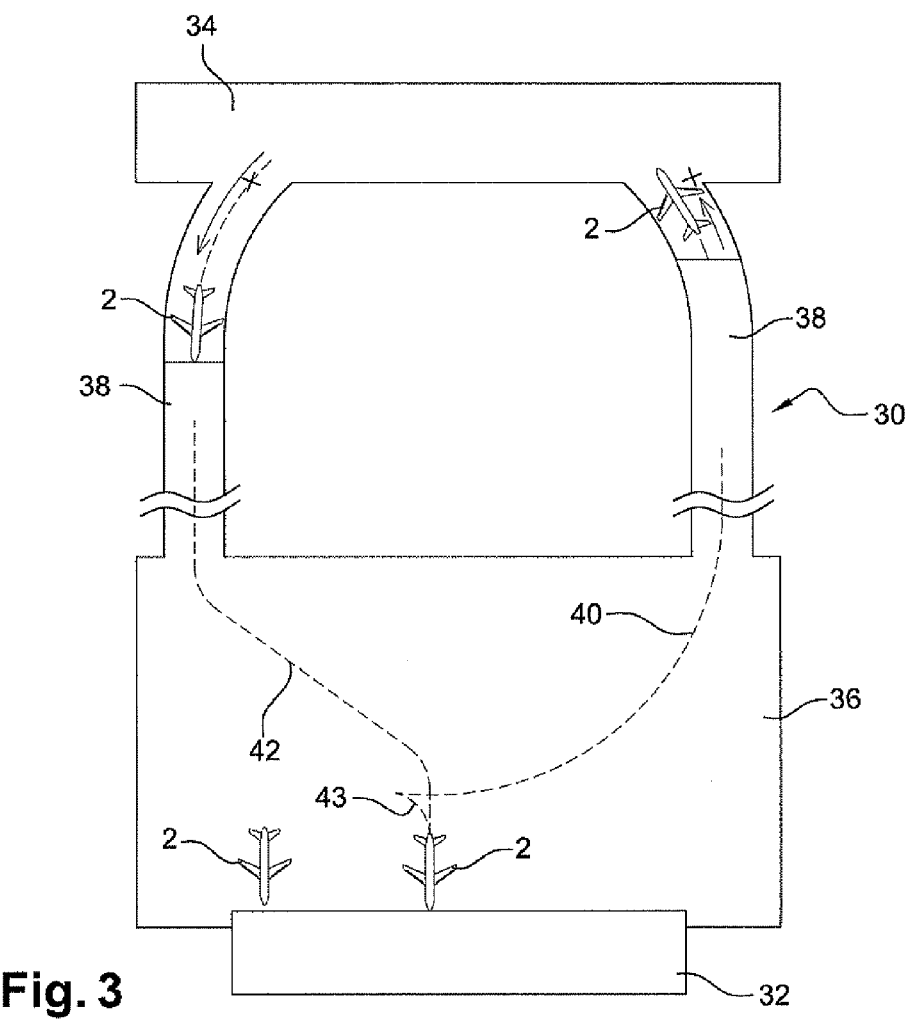
FIG. 3 is a plan view of an airport zone showing the movements on the ground of the FIG. 1 aircraft.

With reference to FIGS. 1 to 3, there follows a description of a second implementation of the method of the invention. In this implementation, taxiing is performed simultaneously and directly by means of one of the engines 12 and by means of the motors 22 powered by the APU. This implementation may require the motors 22 to be more powerful than in the above implementation, however it makes an even greater fuel saving possible.

For an aircraft such as the A320, the power needed for acceleration while taxiing is then shared in approximately equal halves between the engine 12 and the two motors 22.

While taxiing at constant speed, the thrust from the engine 12 suffices at weights that are low (relative to maximum takeoff weight). It needs additional power from the motors of the order of 10 kW to 30 kW for higher weights. The engine 12 continues to idle throughout. The other engine 12 is off or at least running at a speed in which it generates no thrust at all.

This implementation is easy to perform since it often happens that current procedures already provide for a short-haul or a medium-haul aircraft to be operated on only one engine 12 while taxiing. Nevertheless, such a procedure suffers from two major constraints, and the hybrid mode of operation proposed herein serves to eliminate those constraints.

The first constraint is that the maximum weight of the airplane for operations performed using a single engine 12 is very limited. This comes from the fact that at heavy weights the pilot needs to deliver a large amount of thrust in order to accelerate. Such asymmetrical thrust then imparts a steering torque on the airplane that gives rise to unacceptable side loading on the nose undercarriage. In the present implementation of the invention, since the engine 12 that is in use continues to operate at idling speed, this phenomenon is much less marked, such that there is no need to limit the maximum weight in the same manner.

The second constraint is associated with the fact that during stages of acceleration, the pilot needs to use the one engine 12 to deliver the thrust that would otherwise have been delivered from both engines during conventional taxiing by means of both engines. Fuel consumption therefore increases much more quickly than thrust and as a result the over consumption of fuel associated with acceleration is much higher when taxiing using only one engine 12. In the present hybrid implementation, the engine 12 that is in use remains continuously idling such that the fuel consumption it generates is exactly half that which would have been associated with both engines 12.

In this implementation, as in the above-described implementation, the motors 12 are dimensioned as they would be for nominal utilization.

Similarly, the benefit concerning reduced wear of the brakes 44 is conserved if use is made of the motors 22 for braking the aircraft, when necessary.

In this implementation, it is possible to envisage that electricity is generated solely by means of the engine 12 that is running. Nevertheless, as in the above implementation, it is preferred to benefit from redundancy in terms of electricity generation and thus to operate the airplane with the APU 24 running. This configuration is likewise in compliance with numerous manufacturers' procedures that make provision, during stages of taxiing on a single engine 12 and without motors 22, for the APU to be running as well. The benefit in terms of fuel consumption is then indeed not so good, but it remains very significant insofar as, depending on its loading, an APU consumes only one-third or one-fourth the amount of fuel (indirectly) as an engine that is idling. The energy delivered to the members of the airplane and to the two motors 22 is thus provided without difficulty by the power distribution network of the airplane.

Amongst various power supply modes, the mode preferred herein is that in which the electrical systems of the aircraft (not including the motors) are powered by the APU, while the motors 22 are powered by the single generator 18 associated with the engine 12 that is running. This configuration serves firstly to isolate the motors 22 from the other electrical systems and thus avoid any risk of electrical interaction during different stages of utilization. It also serves to limit the load on the generator 18 of the working engine 12 to a level that has very little influence on its lifetime and its maintenance costs. Under such circumstances, in the event of a failure of the APU 24, electrical power from the generator 18 can easily be redirected from the motors 22 to the other systems of the aircraft that need it. The electricity network and generators used in this way are thus not overloaded compared with nominal utilization. The impact on their lifetime and maintenance costs is very small or even non-existent. Nevertheless, provision may be made for power to be shared in some other way between the generator 18 and the APU 24.

Once more, in a variant, provision may be made for the motors to be of the hydraulic type. The situation varies depending on how hydraulic power is generated.

If hydraulic power comes from a mechanical pump driven by the engine 12, then the situation is simple since the electrical and hydraulic loads are separate. It then suffices to ensure that sufficient hydraulic power is always available for the other functions needed while taxiing, in particular steering the nosewheel and braking by means of the brakes 44.

If the hydraulic power comes from an electrically-driven pump powered by the airplane network, then circumstances are similar to the all-electric solution. Nevertheless, it is not possible to separate the power supply to the conventional power-consuming members of the airplane and to the motors 22, unless there is a dedicated hydraulic circuit, which might be envisaged.

Other Considerations

In each of these implementations, during taxiing, the computer 28 operates automatically to manage the commands that are delivered to the engines 12 and to the motors 22 so as to coordinate them while the airplane is taxiing. The computer 28 itself receives commands from the pilot that are transmitted by means of the single common member 26. This member is used by the pilot to cause taxiing to accelerate or slow down, e.g. during braking. The principle on which this automation relies consists in sensing the pilot's request in terms of a longitudinal movement command, and then in allowing the dedicated computer 28 to decide on the most appropriate way of achieving this command, preferably while minimizing fuel consumption. For this purpose, the computer may take the following parameters into account or cause them to be modified:

the speeds of the engines 12, associated with respective levels of thrust and of fuel consumption;

torque from the motors 22, and associated power consumption;

taking power from the generators 18 of the engines or from the APU 24, and associated levels of fuel consumption; and limitations of the system in terms of ability to deliver or use power associated with the capacity of each system to respond to the command from the pilot.

Otherwise, provision may be made for the pilot to provide most of the management of the various members while taxiing by using separate controls, such as:

the throttles for thrust from the engines 12.

the pedals for activating the brakes 44; and a dedicated system, e.g. of the "side stick" type, for generating acceleration or deceleration by means of the motors 22.

However this solution has the drawback that the pilot does not have as much information available for decision making in order to optimize the management of the various controls while minimizing fuel consumption.

Thus, the computer 28 translates orders issued by the pilot using the member 26 into one or more thrust commands for the engines 12, torque commands for the motors 22, or braking commands for the motors, or indeed applications of the brakes 44, should that be necessary.

This ensures that utilization of the commands gives priority to the motors 22 for speed variations, whether for acceleration or for slowing down. When the motors are not capable of achieving a predetermined performance level, then the computer 28 increases or reduces as appropriate the thrust from the main engine(s) 12, or makes use of the conventional brakes 44. This principle serves to obtain the best possible reduction in fuel consumption and brake wear, particularly if the brakes are carbon brakes. Provision may be made for a plurality of computers to perform the task accomplished by the single computer 28.

The computer 28 has one or more microprocessors, clocks, memories, and means adapted to sending and receiving signals, in particular control signals for implementing the above-mentioned steps. All or some of the above-mentioned steps are executed or controlled by the computer by means of one or more programs recorded on a data recording medium and including code instructions suitable for controlling the execution of those steps when executed on a computer. Provision may be made for such a program to be made available on a telecommunications network, in particular for downloading purposes.

Figure 4:
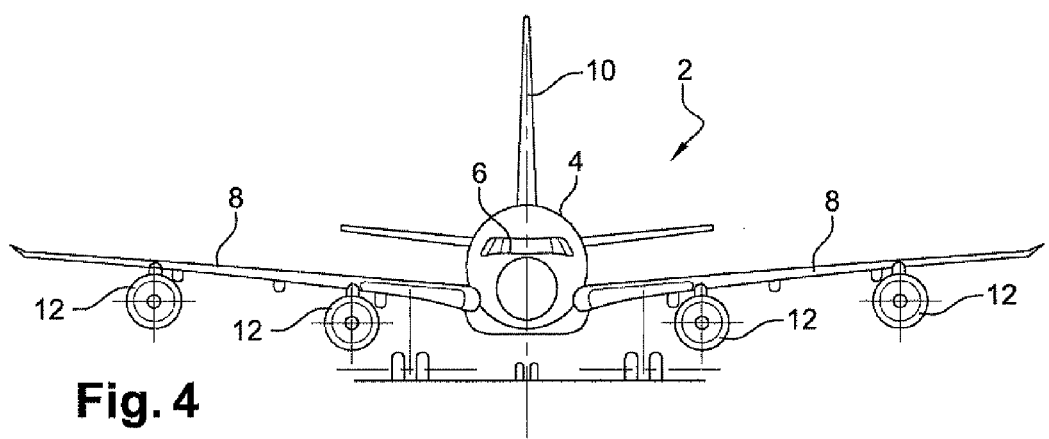
FIG. 4 is a view analogous to FIG. 1 showing a second embodiment of the aircraft.

Another variant embodiment is shown in FIG. 4, relating more particularly to long-haul aircraft, that are frequently fitted with three or four engines 12. The aircraft 2 is analogous to that shown in FIG. 1 and it differs therefrom mainly by the fact that it has four main engines 12 instead of only two. With this airplane, it is possible to perform the first implementation of the invention with taxiing being driven directly and simultaneously by means of the motors 22 and at least two of the engines 12. It is also possible to perform the second implementation by taxiing directly and simultaneously by means of the motors 22 and only one of the engines 12, the APU being also used to generate electricity. The invention is particularly advantageous on aircraft of this type since in conventional operation, it is generally not possible to taxi using only one of the engines 12.

In another variant, provision may be made for the invention to be implemented with motors 22 that are of the pneumatic type. The APU 24 and the engines 12 generate pneumatic power on most aircraft. With an appropriate adaptation of the pneumatic circuit of the aircraft, it is possible to envisage using a portion of this power, e.g. the pneumatic power from the APU, to power the air conditioning system of the airplane, and to use another portion, e.g. that coming from the engines 12, to power the motors 22.

In all of these implementations and their variants, the motors 22 remain available, if necessary, for ensuring that the airplane has its own independent backward-pusher means without needing to use a pusher tractor, where pushing seeks to reverse the airplane so as to allow it to leave its parking point, as represented by segment 43 of the path 40 in FIG. 3. This stage of taxiing is performed in reverse relative to the flight direction of the airplane, whereas the major portion of taxiing takes place forwards, as explained above. While pushing backwards, the motors 22 may continue to be powered by the APU without any need for being overdimensioned since the performance required remains modest (e.g. of the order of about 10 kW).

Implementations of the invention are described above using one or more engines running at idling speed, however the invention may be implemented with said engine(s) operating at some other speed.

The invention claimed is:

1. An aircraft comprising:
   at least one engine suitable for propelling the aircraft in flight;
   at least one motor of an undercarriage; and
   automatic means arranged to cause the aircraft to taxi under drive directly from the engine, while simultaneously using the motor for taxiing, other than during takeoff or landing.

2. An aircraft according to claim 1, wherein the automatic means are arranged to use the motor for braking while taxiing.

3. An aircraft according to claim 1, wherein the automatic means are arranged to cause taxiing to be driven directly and simultaneously by means of the engine and the motor.

4. An aircraft according to claim 1, wherein the automatic means are arranged to control taxiing by means of at least two engines.

5. An aircraft according to claim 4, wherein the automatic means are arranged to control the engines to deliver power for taxiing that is greater than the power delivered by the motor.

6. An aircraft according to claim 5, wherein the automatic means are arranged to cause the power delivered for taxiing by the motor to remain constant, while causing the engines to deliver an increase in power for taxiing.

7. An aircraft according to claim 1, wherein the aircraft includes at least two engines and the automatic means are arranged to control taxiing directly and simultaneously under drive from a single one of those engines and the motor.

8. An aircraft according to claim 1, wherein the automatic means are arranged to cause power to be supplied to the motor preferably mainly, or even exclusively, from an electricity generator of the engine.

9. An aircraft according to any preceding claim 1, including a common manual control member suitable for controlling the engine and the motor simultaneously while taxiing.

10. A method of taxiing an aircraft wherein, away from a takeoff and/or landing runway, the aircraft is made to taxi directly by means of at least one aircraft engine suitable for propelling the aircraft in flight while simultaneously using at least one motor of an undercarriage of the aircraft for taxiing.

* * * * *